(12) United States Patent
Hirata et al.

(10) Patent No.: US 7,975,470 B2
(45) Date of Patent: Jul. 12, 2011

(54) APPARATUS FOR JUDGING CONDITION OF INJECTION OF REDUCING AGENT INCORPORATED IN EXHAUST GAS PURIFICATION SYSTEM

(75) Inventors: Kiminobu Hirata, Ageo (JP); Nobuhiko Masaki, Ageo (JP); Masakazu Yano, Ageo (JP)

(73) Assignee: Nissan Diesel Motor Co., Ltd., Ageo-shi, Saitama (JP)

( * ) Notice: Subject to any disclaimer, the term of this patent is extended or adjusted under 35 U.S.C. 154(b) by 238 days.

(21) Appl. No.: 11/880,858

(22) Filed: Jul. 23, 2007

(65) Prior Publication Data

US 2007/0266703 A1 Nov. 22, 2007

Related U.S. Application Data

(63) Continuation of application No. PCT/JP2005/018261, filed on Oct. 3, 2005.

(30) Foreign Application Priority Data

Mar. 14, 2005 (JP) ................................. 2005-071007

(51) Int. Cl.
*F01N 3/00* (2006.01)
(52) U.S. Cl. ............... 60/277; 60/286; 60/295; 60/301; 60/303
(58) Field of Classification Search ............ 60/276, 60/277, 286, 301, 303
See application file for complete search history.

(56) References Cited

U.S. PATENT DOCUMENTS

| 6,119,448 | A  | * | 9/2000  | Emmerling et al. | ............ 60/274 |
| 6,167,698 | B1 | * | 1/2001  | King et al.      | ............ 60/286 |
| 6,487,852 | B1 | * | 12/2002 | Murphy et al.    | ............ 60/286 |
| 6,983,589 | B2 | * | 1/2006  | Lewis et al.     | ............ 60/277 |

FOREIGN PATENT DOCUMENTS

| EP | 1 176 295 A2 | 1/2002 |
| EP | 1 505 271 A1 | 2/2005 |
| JP | 2000-027627 | 1/2000 |
| JP | 2002-038928 | 2/2002 |
| JP | 2003-269145 | 9/2003 |
| JP | 2003-343240 | * 12/2003 |
| JP | 2005-054723 | 3/2005 |

* cited by examiner

*Primary Examiner* — Thomas E Denion
*Assistant Examiner* — Diem Tran
(74) *Attorney, Agent, or Firm* — McDermott Will & Emery LLP

(57) ABSTRACT

In relation to an exhaust gas purification system that mixes a liquid reducing agent with air and injection-supplies this mixture into an exhaust gas flowing on an upstream side of a reduction catalyst (20) to thereby effect reduction purification of NOx in exhaust gas, a technical attention is directed to the relation of respective elements of; the travel distance, the fuel consumption, the air consumption, or the running time and the like, and the liquid reducing agent consumption, to constitute a configuration such that a continual monitor as to whether the injection condition of liquid reducing agent is normal or abnormal is executed by judging whether or not the amount of liquid reducing agent consumed for a predetermined travel distance, a predetermined fuel consumption, a predetermined air consumption, or a predetermined running time, is within a predetermined range.

6 Claims, 9 Drawing Sheets

APPARATUS FOR JUDGING CONDITION OF INJECTION OF REDUCING AGENT INCORPORATED IN EXHAUST GAS PURIFICATION SYSTEM

This application is a continuation of PCT/JP2005/018261, filed on Oct. 3, 2005.

BACKGROUND OF THE INVENTION

1. Field of the Invention

The present invention relates to an exhaust gas purification system for an engine that injection-supplies a liquid reducing agent into an exhaust gas flowing on an upstream side of a reduction catalyst in the exhaust system of the engine to reduce NOx in the exhaust gas from the engine thereby purifying the exhaust gas before being exhausted into the atmosphere. More particularly, the invention relates to an apparatus for judging a condition of injection of reducing agent (it will be hereinunder referred to as "injection-condition judging apparatus" for the sake of brevity throughout the disclosure.) used in an exhaust gas purification system that monitors whether or not a liquid reducing agent is being normally injection-supplied.

2. Description of the Related Art

As an exhaust gas purification system which removes the NOx contained in the exhaust gas discharged from an engine, such as a diesel engine and a gasoline engine, an exhaust gas purification system has been proposed, which injection supplies a liquid reducing agent in a required amount corresponding to an engine operating state onto the upstream side of a reduction catalyst disposed in an exhaust system of an engine, to thereby create a catalytic reduction reaction between the NOx in the exhaust gas and the liquid reducing agent in order to purify the NOx to harmless elements (for example, refer to Japanese Unexamined Patent Publication No. 2000-27627). Here in the reduction reaction, ammonia, which has good reactivity with NOx, is used as the reducing agent, and for the liquid reducing agent, a urea water solution serving as a generation source of ammonia, is used. As the reducing agent, it can be considered to use not only ammonia, but also an ammonia water, a hydrocarbon such as gas oil, and alcohol.

Incidentally, in this type of exhaust gas purification system, it is necessary to monitor whether or not the liquid reducing agent is being normally injection-supplied in the required amount corresponding to the engine operating state. In a case where the liquid reducing agent is not being normally injection-supplied, for example, taking as one typical example a system that uses a urea water solution as the liquid reducing agent, this gives rise to problems such that if an injection-supply amount of the urea water solution is less than a specified amount, the NOx exhaust amount increases, while on the other hand, if the injection-supply amount of the urea water solution is greater than the specified amount, excessive ammonia, which is not used for the reduction reaction of the NOx, is discharged.

SUMMARY OF THE INVENTION

The present invention addresses such problems, with an object of monitoring whether or not the injection condition of the liquid reducing agent is normal, to thereby reduce the exhaust amount of the NOx and prevent discharge of the liquid reducing agent.

Therefore, in order to achieve the above-mentioned object, the present invention provides an apparatus for judging a condition of injection of reducing agent in an exhaust gas purification system, which comprises a reduction catalyst disposed in an exhaust system of an engine to reduce and purify nitrogen oxide in an exhaust gas, and a reducing agent injection supply means that mixes liquid reducing agent in an amount required depending on an engine operating state with air and injection-supplies this air-mixed liquid reducing agent into the exhaust gas flowing on an upstream side of the reduction catalyst, wherein there is provided such a configuration that a condition of injection of the liquid reducing agent is judged by using at least one of a plurality of judgment means selected from: a first judgment means that judges that the condition of injection of the liquid reducing agent is abnormal, when a consumption of the liquid reducing agent during traveling by a predetermined distance is not within a predetermined range; a second judgment means that judges that the condition of injection of the liquid reducing agent is abnormal, when a consumption of the liquid reducing agent during consuming of a predetermined amount of fuel is not within a predetermined range; a third judgment means that judges that the condition of injection of the liquid reducing agent is abnormal, when a consumption of the liquid reducing agent during consuming of a predetermined amount of air is not within a predetermined range; a fourth judgment means that judges that the condition of injection of the liquid reducing agent is abnormal, when a consumption of the liquid reducing agent during traveling for a predetermined time is not within a predetermined range; a fifth judgment means that judges that the condition of injection of the liquid reducing agent is abnormal, when a consumption of the air during traveling of a predetermined distance is not within a predetermined range; a sixth judgment means that judges that the condition of injection of the liquid reducing agent is abnormal, when a consumption of the air during consuming of a predetermined amount of fuel is not within a predetermined range; a seventh judgment means that judges that the condition of injection of the liquid reducing agent is abnormal, when a consumption of the air during traveling for a predetermined time is not within a predetermined range; and an eighth judgment means that judges that the condition of injection of the liquid reducing agent is abnormal, when a difference between a supply indicated value of the liquid reducing agent determined based on the engine operating state and instructed to the reducing agent injection supply means, and an actual supply amount of the liquid reducing agent actually injection-supplied is not within a predetermined range.

Preferably, the present invention comprises such a configuration that there is further provided an informing means that informs of abnormality based on an abnormality judgment output from the selected judgment means.

Further preferably, the present invention may take such a configuration that consumption of the liquid reducing agent mentioned in the first through fourth judgment means is specifically measured by using any one of a variation value of liquid level for inside a storage tank of a liquid reducing agent, a supply indicated value of a liquid reducing agent instructed to the reducing agent injection supply means, a liquid reducing agent added map value preliminarily stored in association with an engine operating state, and a sensor value of a liquid reducing agent flow sensor interposed in a liquid reducing agent supply piping.

A further preferably, the present invention may take such a configuration that the predetermined travel distance is specifically measured by using either one of a travel distance integration meter value and a vehicle speed sensor value.

A still further preferably, the configuration taken by the present invention may be made such that the predetermined fuel consumption is specifically measured by using either one of a liquid level variation value for inside a fuel tank, and a fuel injection supply calculation amount determined depending on a detected engine operating state.

Moreover, the configuration taken by the present invention is preferably made such that the air consumption is specifically measured by using a sensor value of an air-flow sensor interposed in an air supply pipe.

Furthermore, the configuration taken by the present invention is preferably made such that the predetermined running time is specifically measured by using any one of engine operating time, time during which vehicle speed is not zero, and time during which exhaust gas temperature is equal to or greater than a predetermined temperature.

According to the apparatus for judging a condition of injection of reducing agent according to the present invention, attention is directed to the relation with respective elements between the reducing agent consumption and any one of; the travel distance, the fuel consumption, the air consumption and the running time, to continually monitor the injection condition of the liquid reducing agent. Accordingly, abnormal injection of the liquid reducing agent can be found at an early stage, and an increase in the NOx resulting from imperfect NOx purification due to abnormal injection can be prevented. Moreover, when the urea water solution is used as the liquid reducing agent, discharge of ammonia can be prevented.

DESCRIPTION OF THE PREFERRED EMBODIMENTS

Hereunder is a detailed description of embodiments of the present invention, based on the drawings.

Figure 1:
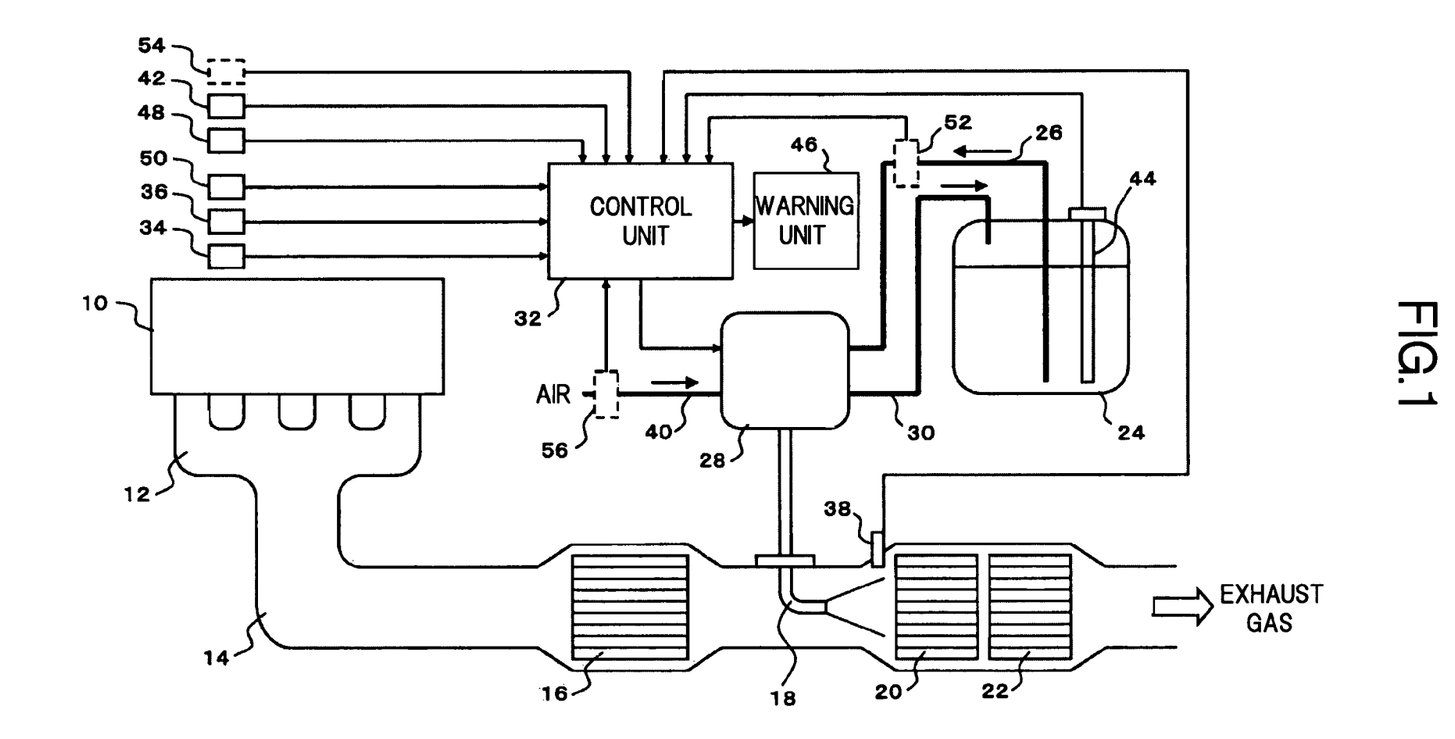
FIG. 1 is an overall block diagram of an exhaust gas purification system, in which an apparatus for judging a condition of injection of reducing agent according to the present invention is incorporated.

FIG. 1 shows an overall configuration of an exhaust gas purification system, in which a first embodiment of a apparatus for judging a condition of injection of reducing agent, according to the present invention is incorporated, which uses a urea water solution as a liquid reducing agent to purify NOx in an exhaust gas of an engine by a catalytic reduction reaction.

Referring to FIG. 1, the exhaust gas purification system includes an exhaust pipe 14, which is connected to an exhaust manifold 12 of an engine 10, and there are arranged along an exhaust gas flow direction in the exhaust pipe 14 an oxidation catalyst 16 that oxidizes nitrogen monoxide (NO) to nitrogen dioxide ($NO_2$), an injection nozzle 18 that injection-supplies the urea water solution, a NOx reduction catalyst 20 that reduces and purifies NOx by ammonia obtained by hydrolyzing the urea water solution, and an ammonia oxidation catalyst 22 that oxidizes ammonia having passed through the NOx reduction catalyst 20, respectively. The urea water solution stored in a reducing agent tank 24 is supplied to a reducing agent adding unit 28 via a reducing agent supply piping 26, while the surplus urea water solution not being injected from the reducing agent adding unit 28 is returned to an upper space of the reducing agent tank 24 via a return pipe 30. The reducing agent adding unit 28 is controlled by a control unit 32 having a computer built therein. The control unit 32 judges, for example from a reducing agent adding map, a urea water solution of a required amount corresponding to an engine operating state detected based on respective signals from a rotating speed sensor 34 for detecting engine speed, an accelerator opening sensor 36, an exhaust gas temperature sensor 38, and the like, and outputs a supply amount instruction signal corresponding to the judged value to the reducing agent adding unit 28. The reducing agent adding unit 28 mixes the urea water solution of an amount in compliance with the instruction signal with air supplied from an air pipe 40 connected to a reservoir tank (not shown) and supplies the air-mixed reducing agent to the injection nozzle 18. Here, a combination of the injection nozzle 18, the reducing agent tank 24, the reducing agent adding unit 28, and the control unit 32 constitutes one example of the reducing agent injection supply means.

At this stage, in the apparatus for judging the condition of injection of reducing agent according to the present embodiment, the configuration is such that the injection condition of liquid reducing agent is judged from a relationship between a vehicle travel distance and a liquid reducing agent consumption, and includes the configuration of a first judgment means that judges that there is abnormal injection of the urea water solution when a consumption of the urea water solution during traveling by a predetermined distance is not within a predetermined range. Accordingly, signals from a travel distance integration meter 42 and a reducing agent level meter 44 provided on the reducing agent tank 24 are inputted to the control unit 32. The control unit 32 conducts reading of the travel distance from the travel distance integration meter 42 and measures the consumption of the urea water solution from a variation value of a liquid level measured by the reducing agent level meter 44, and judges the injection condition of the urea water solution based on these values. Then, when the control unit 32 judges that there is an abnormality, the unit generates an abnormality judgment output for a warning unit 46 serving as the informing means, to inform a user of abnormal injection of the urea water solution by the warning unit 46 using an audio-alarm unit, a warning light, or the like. The apparatus for judging the injection condition of reducing agent of this embodiment comprises the control unit 32, the travel distance integration meter 42, the reducing agent level meter 44, and the warning unit 46.

The NOx purification operation of the exhaust gas purification system will be briefly explained. The urea water solution injection supplied from the injection nozzle 18 is hydrolyzed by exhaust heat and water vapor in the exhaust gas to produce ammonia. The produced ammonia reacts with the NOx in the exhaust gas and is purified to water and a harmless gas in the NOx reduction catalyst 20. At this time, the NO is oxidized to $NO_2$ by the oxidation catalyst 16 and a proportion between the NO and the $NO_2$ in the exhaust gas is improved to one appropriate to the catalytic reduction reaction in order to improve a NOx purification rate by the NOx reduction catalyst 20. Moreover the ammonia that has passed through the NOx reduction catalyst 20 is oxidized by the ammonia oxidation catalyst 22 disposed on the exhaust gas downstream side thereof. Therefore it is possible to prevent ammonia having an offensive smell from being directly released into the atmosphere.

Figure 2:
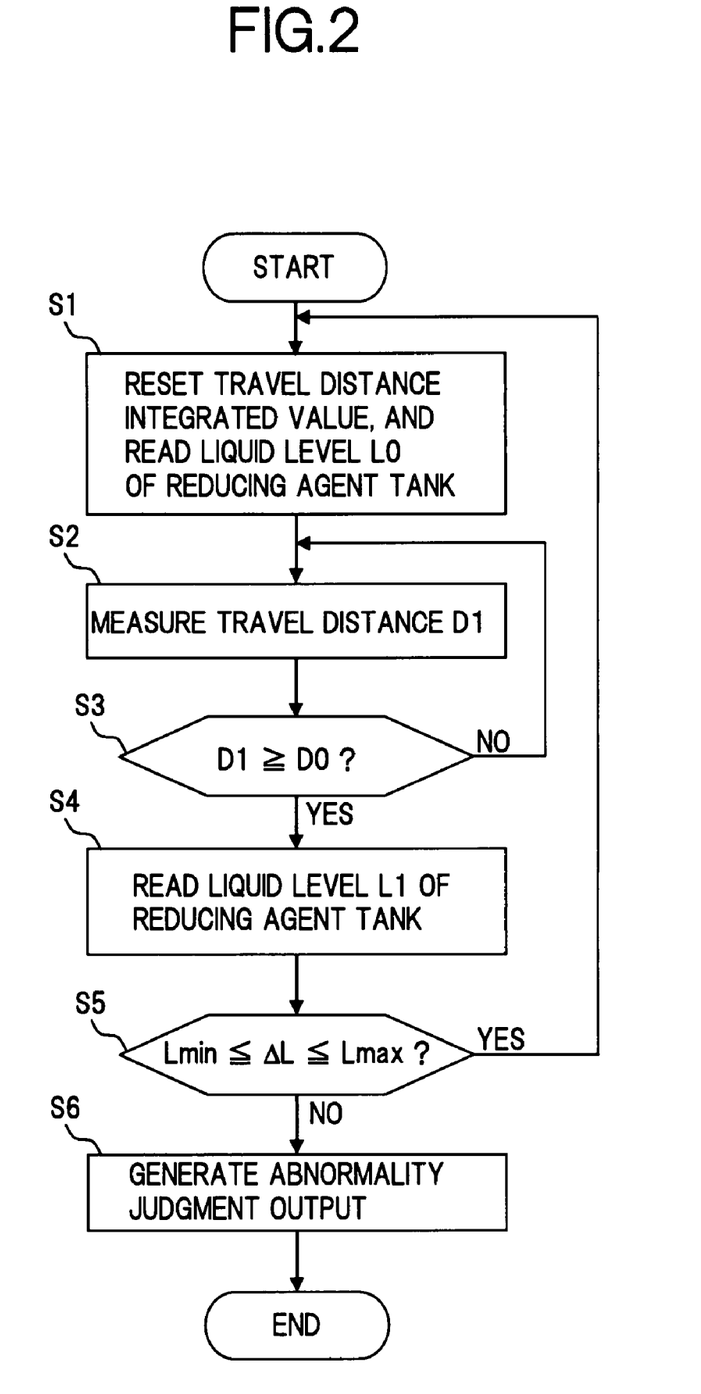
FIG. 2 is a flow chart for explaining the operation of a first embodiment of the apparatus for judging a condition of injection of reducing agent, according to the present invention.

Next is a description of the condition judging operation of the apparatus for judging the condition of injection of reducing agent according to the first embodiment, with reference to the flow chart of FIG. 2.

The judging operation is started by an ON operation of a key switch 48. When an ON signal is input from the key switch 48, then in step 1 (denoted as S1 in the figure, and similarly hereunder), a travel distance integrated value, which has been stored when the key switch 48 is turned off in the previous operation, is reset and the current liquid level is read from the reducing agent level meter 44 and stored as liquid level L0.

In step 2, measurement of the travel distance is started. Here, a travel distance value of the travel distance integration meter 42 is read at constant time intervals, and the value is stored and updated as travel distance D1.

In step 3, it is judged whether or not the travel distance D1 measured in step 2 is equal to or greater than a preset predetermined travel distance D0, and the measurement operation of the travel distance in step 2 is repetitively executed until D1 becomes equal to or greater than D0 (D$1 \geq$D0). When D$1 \geq$D0, it is determined that D1 has reached the predetermined distance, and control proceeds to step 4.

In step 4, the liquid level of the reducing agent tank 24 at that time is read from the reducing agent level meter 44 and stored as liquid level L1.

In step 5, it is judged whether or not a consumption $\Delta L$ of the urea water solution calculated from a change of the measured liquid level (L1–L0) is within a range between an upper limit Lmax and a lower limit Lmin preset for a consumption when the urea water solution is normally injected at the time of traveling a predetermined travel distance D0. If Lmin$\leq \Delta L \leq$Lmax, it is determined that the injection of the urea water solution is normal, and control returns to step 1. On the other hand, if not Lmin$\leq \Delta L \leq$Lmax, it is determined that the injection of the urea water solution is abnormal, and control proceeds to step 6, where the control unit 32 generates an abnormality judgment output, and drives the warning unit 46 to inform the user of abnormal injection of the urea water solution.

According to this configuration, abnormal injection of the liquid reducing agent can be found at an early stage, and an increase in the NOx exhaust amount resulting from imperfect purification of the NOx can be prevented, with prevention of discharge of ammonia.

In the first embodiment, the configuration is such that the consumption of the urea water solution is measured from a change in the liquid level of the reducing agent tank 24. However, the present invention is not limited thereto, and, for example, the supply amount instruction signal to be transmitted from the control unit 32 to the reducing agent adding unit 28 may be integrated, or a map value read from the reducing agent adding map used at the time of determining the injection amount of the urea water solution may be integrated by the control unit 32. Furthermore, for example a flow sensor 52 may be installed in the reducing agent supply piping 26 as shown by the broken line in FIG. 1, and the measurement value of the flow sensor 52 may be used.

Moreover, the travel distance can be obtained from the travel distance integration meter 42, or may be calculated for example by integrating vehicle speed data obtained from a vehicle speed signal input from a vehicle speed sensor 50 to the control unit 32.

Furthermore in the first embodiment, the configuration is such that the previous travel distance integrated value is reset by the ON operation of the key switch 48. However, the configuration may be such that when the key switch 48 is turned off before the travel distance becomes the predetermined travel distance D0, the travel distance value immediately before turning off of the key switch 48 is stored, and when the key switch 48 is turned on next time, the travel distance value thereafter is added to the value stored previously. In this case, it is a matter of course that the liquid level L0 is also stored.

Next is a description of a second embodiment of the apparatus for judging the condition of injection of reducing agent according to the present invention.

In the apparatus for judging the condition of injection of reducing agent according to the second embodiment, the configuration is such that the injection condition of liquid reducing agent is judged from a relationship between a fuel consumption and a consumption of the liquid reducing agent, and includes the configuration of a second judgment means that judges that there is abnormal injection of the liquid reducing agent when a consumption of the urea water solution while consuming a predetermined amount of fuel is not within a predetermined range. Accordingly, in this embodiment, a fuel level meter 54 that detects a liquid level inside a fuel tank (not shown) is used for measurement of the fuel consumption, and a measurement signal of the fuel level meter 54 is input to the control unit 32 as shown by the broken line in FIG. 1. The control unit 32 in this embodiment measures the fuel consumption from a variation value of the liquid level measured by the fuel level meter 54, measures the consumption of the urea water solution from a variation value of the liquid level measured by the reducing agent level meter 44, and judges the injection condition of the urea water solution based on these values, and when judged that there is an abnormality, generates an abnormality judgment output for the warning unit 46. Therefore, the apparatus for judging the condition of reducing agent injection of this embodiment comprises the control unit 32, the reducing agent level meter 44, the fuel level meter 54, and the warning unit 46.

Figure 3:
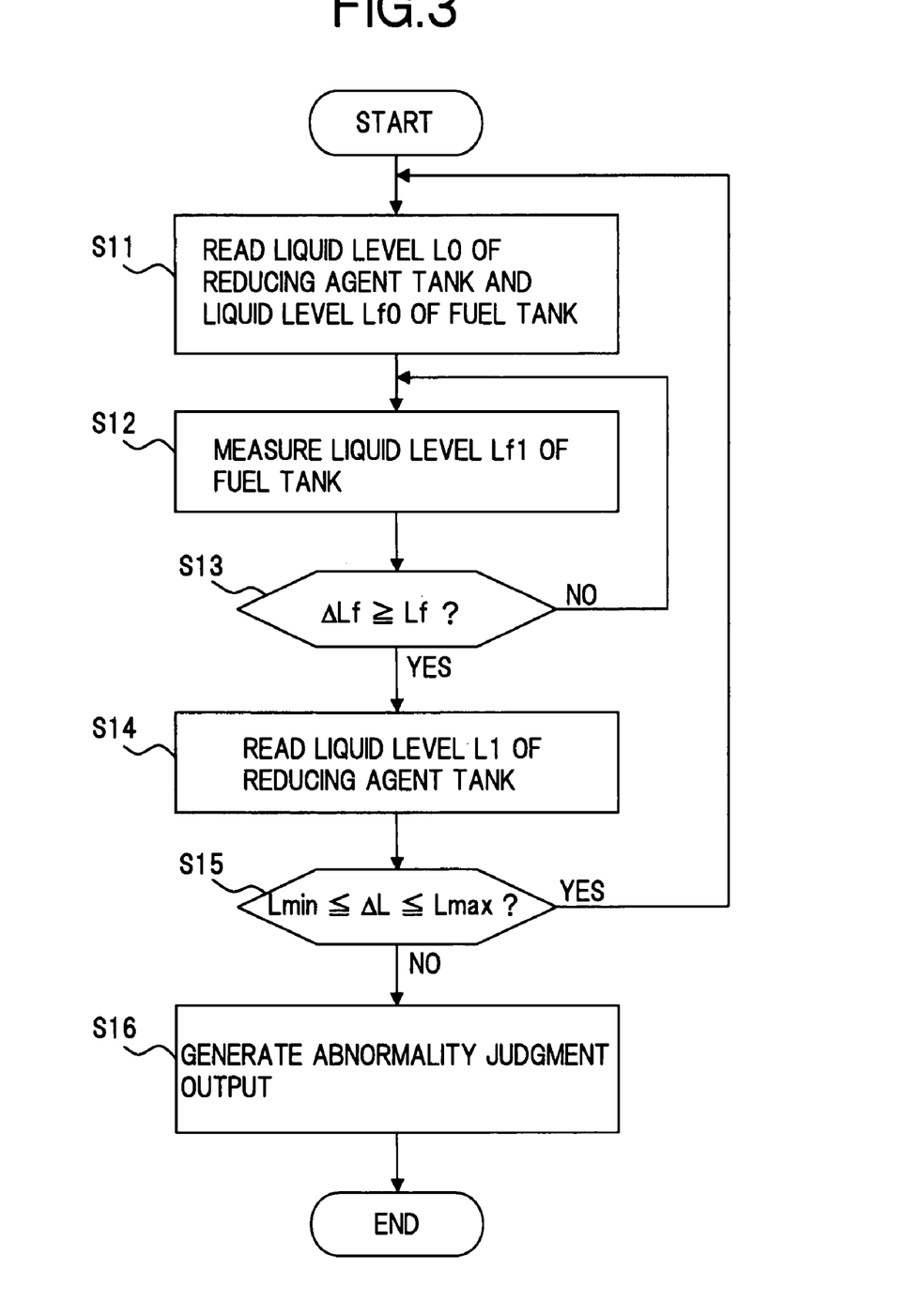
FIG. 3 is a flow chart for explaining the operation of a second embodiment of the apparatus for judging a condition of injection of reducing agent, according to the present invention.

Next is a description of the condition judging operation of the apparatus for judging the condition of injection of reducing agent according to the second embodiment, with reference to the flow chart of FIG. 3. Also in this embodiment, the operation is started by an input of an ON signal from the key switch 48.

In step 11, the current respective liquid levels are read from the reducing agent level meter 44 and the fuel level meter 54, and respectively stored as reducing agent liquid level L0 and fuel liquid level Lf0.

In step 12, measurement of the fuel consumption is started. Here, the liquid level is read from the fuel level meter 54 at constant time intervals, and the integrated value thereof is stored and updated as liquid level Lf1.

In step 13, it is judged whether or not the fuel consumption ΔLf calculated from a change in the liquid level (Lf1−Lf0) in the fuel tank becomes equal to or greater than a preset predetermined fuel consumption Lf, and the measurement operation of the liquid level of the fuel tank in step 12 is repetitively executed until ΔLf becomes equal to or greater than Lf (ΔLf≧Lf). When ΔLf≧Lf, it is determined that ΔLf has reached the predetermined fuel consumption, and control proceeds to step 14.

The operations in steps 14 through 16 are the same as in steps 4 through 6 in the first embodiment shown in FIG. 2. In step 14, the liquid level L1 of the reducing agent tank at that time is read from the reducing agent level meter 44. In step 15 it is judged whether or not the consumption ΔL of the urea water solution calculated from a change in the measured liquid level (L1−L0) is within a range of Lmin≦ΔL≦Lmax, and when Lmin≦ΔL≦Lmax, it is determined that injection of the urea water solution is normal, and control returns to step 11. When not Lmin≦ΔL≦Lmax, it is determined that there is abnormal injection of the urea water solution, and control proceeds to step 16, where the control unit 32 generates an abnormality judgment output, and drives the warning unit 46 to inform the user of abnormal injection of the urea water solution.

Regarding the measurement of the fuel consumption, other than by calculating from the liquid level of the fuel tank, this may be measured by integrating a read value of the fuel injection quantity map set associated with, for example, the engine speed and the accelerator opening.

Next is a description of a third embodiment of the apparatus for judging the condition of injection of reducing agent according to the present invention.

In the apparatus for judging the condition of injection of reducing agent according to the third embodiment, the configuration is such that the injection condition of liquid reducing agent is judged from a relationship between a consumption of air mixed with the urea water solution and a consumption of the liquid reducing agent, and includes the configuration of a third judgment means that judges that there is abnormal injection of the liquid reducing agent when a consumption of the urea water solution while consuming a predetermined amount of air is not within a predetermined range. Accordingly, in this embodiment, the configuration is such that an air-flow sensor 56 is interposed as shown by the broken line in FIG. 1 in an air pipe 40 connected to the reservoir tank (not shown) to measure the air consumption from a flow rate of air flowing in the air pipe 40. Furthermore a control unit 32 in this embodiment measures the air consumption from a flow value measured by the air flow sensor 56, measures the consumption of the urea water solution from a change in the liquid level measured by the reducing agent level meter 44, judges the injection condition of the urea water solution based on these values, and when judged that there is an abnormality, generates an abnormality judgment output for the warning unit 46. Accordingly, the apparatus for judging the condition of reducing agent injection of this embodiment comprises the control unit 32, the reducing agent level meter 44, the air-flow sensor 56, and the warning unit 46.

Figure 4:
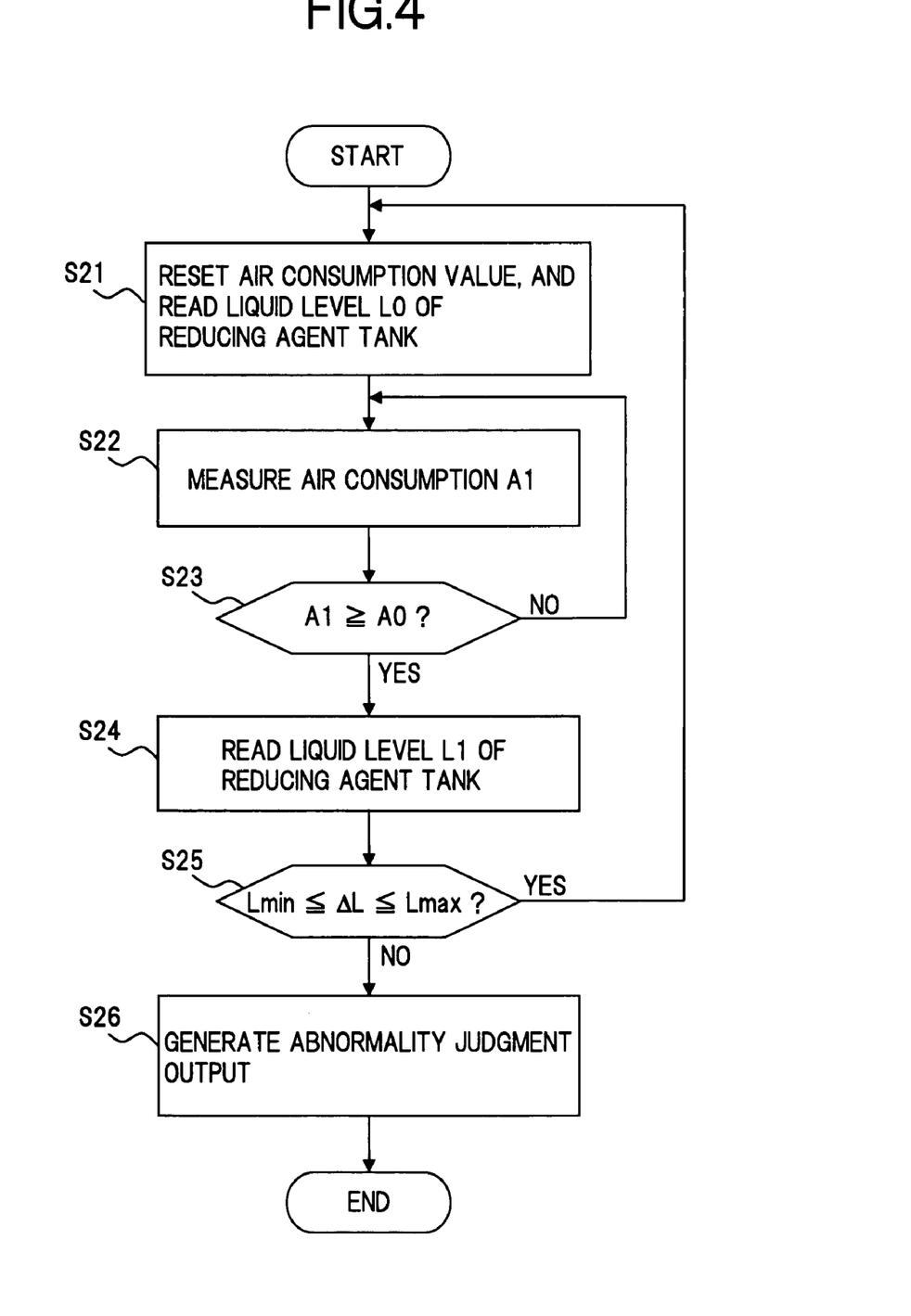
FIG. 4 is a flow chart for explaining the operation of a third embodiment of the apparatus for judging a condition of injection of reducing agent, according to the present invention.

Next is a description of the condition judging operation of the apparatus for judging the condition of reducing agent injection of the third embodiment, with reference to the flow chart of FIG. 4. Also in this embodiment, the operation is started by an input of an ON signal from the key switch 48.

In step 21, the air consumption value, which has been stored when the key switch 48 is turned off in the previous operation, is reset and the current liquid level is read from the reducing agent level meter 44 and stored as liquid level L0.

In step 22, measurement of the air consumption is started. Here, a flow value of the air flow sensor 56 is read at constant time intervals, and the value is stored and updated as air consumption A1.

In step 23, it is judged whether or not the air consumption A1 measured in step 22 is equal to or greater than a preset predetermined air consumption A0, and the measurement operation of the air consumption in step 22 is repetitively executed until A1 becomes equal to or greater than A0 (A1≧A0). When A1≧A0, it is determined that a predetermined quantity of air has been consumed, and control proceeds to step 24.

Then in steps 24 through 26, a normal/abnormal injection condition of the urea water solution is judged in the same manner as in steps 4 through 6 in the first embodiment, and when judged abnormal, the user is informed of the abnormal injection of the urea water solution by the warning unit 46.

Next is a description of a fourth embodiment of the apparatus for judging the condition of injection of reducing agent according to the present invention.

In the apparatus for judging the condition of reducing agent injection of the fourth embodiment, the configuration is such that the injection condition of liquid reducing agent is judged from a relationship between running time of a vehicle and a consumption of the liquid reducing agent, and includes the configuration of a fourth judgment means that judges that there is abnormal injection of the liquid reducing agent when a consumption of the urea water solution while traveling for a predetermined time is not within a predetermined range. In this embodiment, the time during which the vehicle speed is not zero is measured as the running time. Accordingly, the control unit 32 in this embodiment measures the time during which the vehicle speed is not zero as the running time, based on a vehicle speed signal from a vehicle speed sensor 50, measures the consumption of the urea water solution from a change in the liquid level measured by the reducing agent level meter 44, judges the injection condition of the urea water solution based on these values, and when judged that there is abnormal injection, generates an abnormality judgment output for the warning unit 46. Accordingly, the apparatus for judging the condition of reducing agent injection of this embodiment comprises the control unit 32, the reducing agent level meter 44, the vehicle speed sensor 50, and the warning unit 46.

Figure 5:
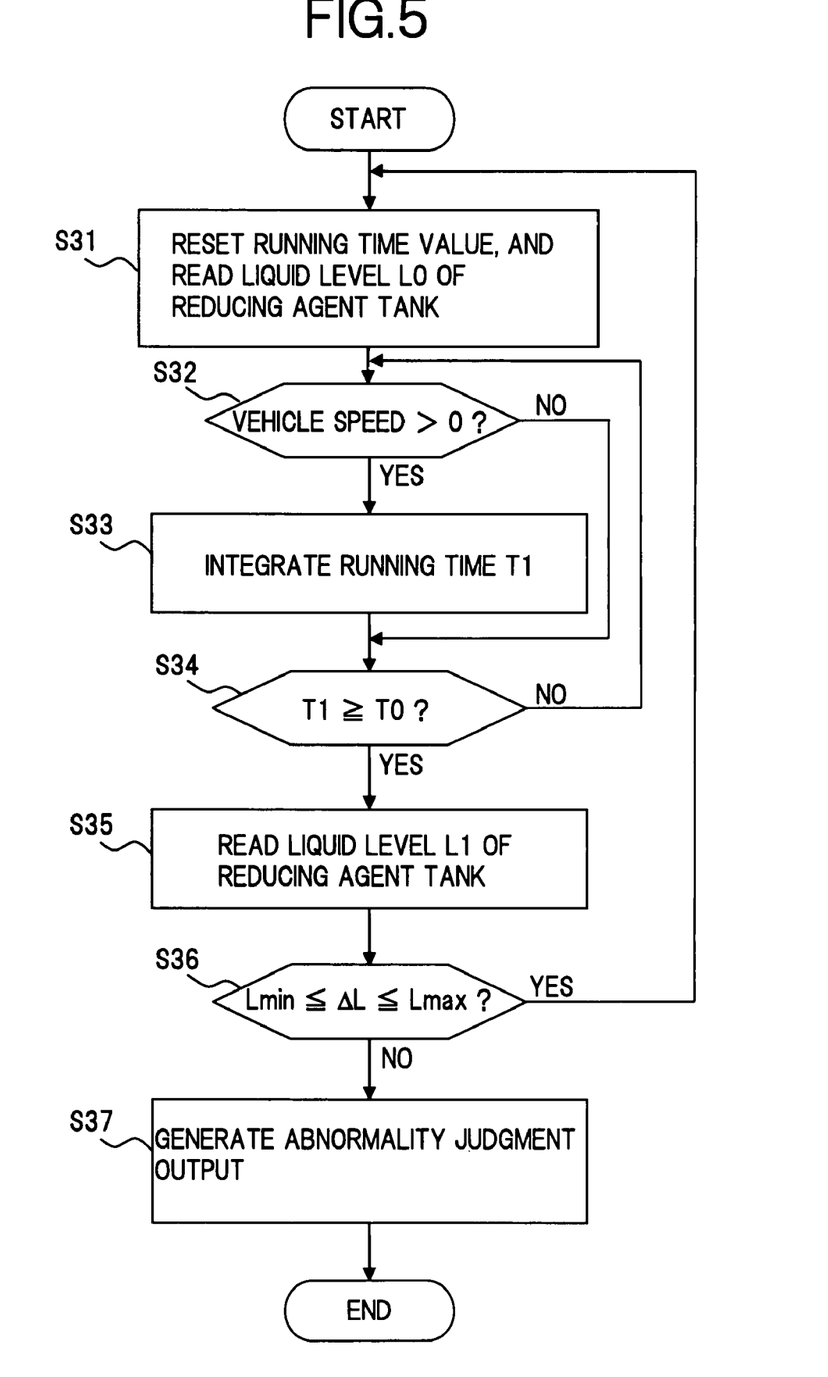
FIG. 5 is a flow chart for explaining the operation of a fourth embodiment of the apparatus for judging a condition of injection of reducing agent, according to the present invention.

Next is a description of the condition judging operation of the apparatus for judging the condition of injection of reducing agent according to the fourth embodiment, with reference to the flow chart of FIG. 5. Also in this embodiment, the operation is started by an input of an ON signal from the key switch 48.

In step 31, running time, which has been stored when the key switch 48 is turned off in the previous operation, is reset and the current liquid level is read from the reducing agent level meter 44 and stored as liquid level L0.

In step 32, it is judged whether or not the vehicle speed is greater than 0 km/h based on a vehicle speed signal from the vehicle speed sensor 50. When the judgment result is YES, control proceeds to step 33, where the running time is measured and integrated, and the integrated value is stored as running time T1, and control proceeds to step 34. When the judgment result is NO, control skips step 33 and proceeds to step 34.

In step 34, it is judged whether or not the running time T1 integrated and measured in step 33 is equal to or greater than a preset predetermined running time T0, and the operations in steps 32 and 33 are repetitively executed until T1≧T0. When T1≧T0, it is determined that the vehicle has traveled for the predetermined time, and control proceeds to step 35.

Then in steps 35 through 37, a normal/abnormal injection condition of the urea water solution is judged in the same manner as in steps 4 through 6 in the first embodiment, and when judged abnormal, the user is informed of the abnormal injection of the urea water solution by the warning unit 46.

As the running time, other than measuring the time during which the vehicle speed is not zero, the engine operating time during which the engine is rotating may be measured, the time during which the exhaust gas temperature is equal to or greater than a certain temperature may be measured, or the time during which the key switch 48 is turned ON may be measured.

Next is a description of a fifth embodiment of the apparatus for judging the condition of reducing agent injection of the present invention.

In the apparatus for judging the condition of reducing agent injection of the fifth embodiment, the configuration is such that the injection condition of liquid reducing agent is judged from a relationship between a vehicle travel distance and an air consumption, and includes the configuration of a fifth judgment means that judges that there is abnormal injection of the urea water solution when the air consumption while traveling for a predetermined distance is not within a predetermined range. Measurement of the travel distance in this embodiment is performed by using the travel distance integration meter 42 as in the first embodiment, and measurement of the air consumption is performed by using the air flow sensor 56 as in the third embodiment. Accordingly, the apparatus for judging the condition of reducing agent injection of this embodiment comprises the control unit 32, the travel distance integration meter 42, the air flow sensor 56, and the warning unit 46.

Figure 6:
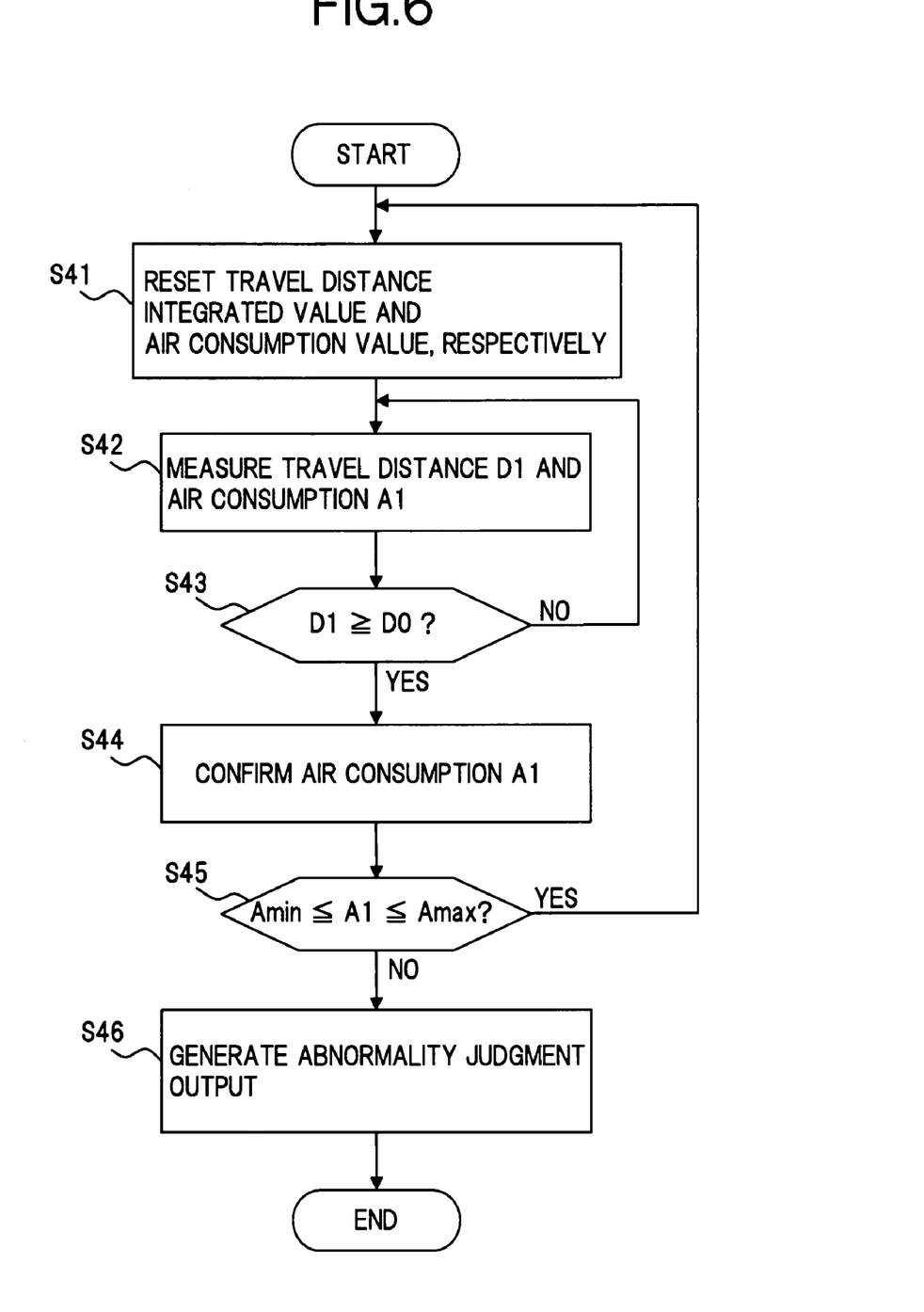
FIG. 6 is a flow chart for explaining the operation of a fifth embodiment of the apparatus for judging a condition of injection of reducing agent, according to the present invention.

Next is a description of the condition judging operation of the apparatus for judging the condition of reducing agent injection of the fifth embodiment, with reference to the flow chart of FIG. 6. Also in this embodiment, the operation is started by an input of an ON signal from the key switch 48.

In step 41, the travel distance integrated value and the air consumption value, which have been stored when the key switch 48 is turned off in the previous operation, are reset respectively.

In step 42, measurement of the travel distance and the air consumption is started. Here, a measurement value of the travel distance integration meter 42 and a flow value of the air flow sensor 56 are respectively read at constant time intervals, and the respective values are stored and updated as travel distance D1 and air consumption A1.

In step 43, it is judged whether or not the travel distance D1 measured in step 42 becomes equal to or greater than the preset predetermined travel distance D0, and the integration operation in step 42 is repetitively executed until D1 becomes equal to or greater than D0 (D1≧D0). When D1≧D0, it is determined that the vehicle has traveled the predetermined distance, and control proceeds to step 44.

In step 44, air consumption A1 at that time is confirmed.

In step 45, it is judged whether or not the air consumption A1 confirmed in step 44 is within a range between an upper limit Amax and a lower limit Amin preset for the air consumption when the urea water solution is normally injected at the time of traveling a predetermined travel distance D0. If Amin≦A1≦Amax, it is determined that the injection of the urea water solution is normal, and control returns to step 41. On the other hand, if not Amin≦A1≦Amax, it is determined that the injection of the urea water solution is abnormal, and the control unit 32 generates an abnormality judgment output in step 46, and drives the warning unit 46 to inform the user of abnormal injection of the urea water solution.

Next is a description of a sixth embodiment of the apparatus for judging the condition of reducing agent injection of the present invention.

In the apparatus for judging the condition of reducing agent injection of the sixth embodiment, the configuration is such that the injection condition of liquid reducing agent is judged from a relationship between a fuel consumption and an air consumption, and includes the configuration of a sixth judgment means that judges that there is abnormal injection of the urea water solution when the air consumption while consuming a predetermined amount of fuel is not within a predetermined range. Accordingly, measurement of the air consumption in this embodiment is performed by using a change in the liquid level of the fuel tank as in the second embodiment, and measurement of the air consumption is performed by using the air flow sensor 56 as in the third and the fifth embodiments. Therefore, the apparatus for judging the condition of reducing agent injection of this embodiment comprises the control unit 32, the fuel level meter 54, the air-flow sensor 56, and the warning unit 46.

Figure 7:
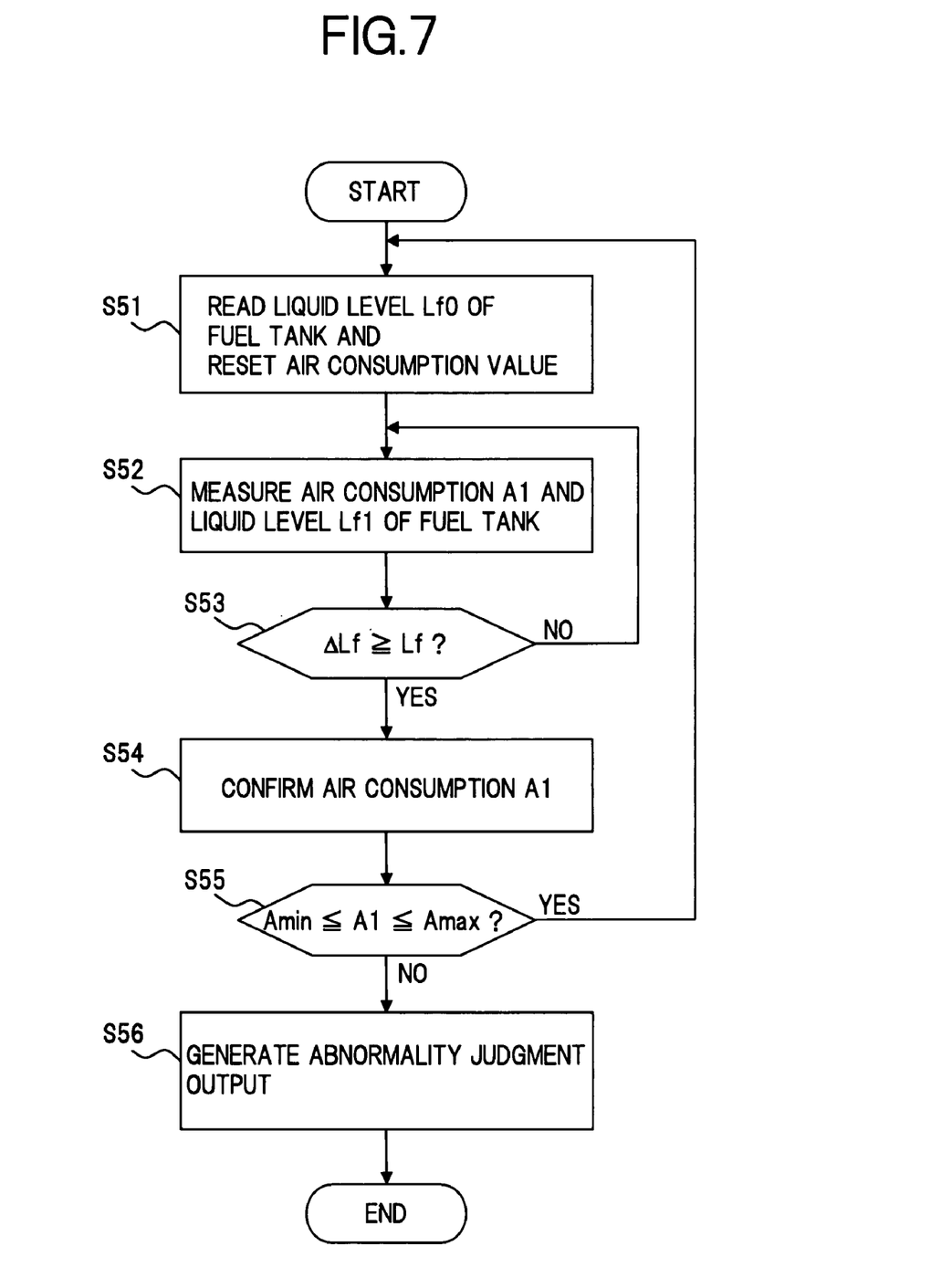
FIG. 7 is a flow chart for explaining the operation of a sixth embodiment of the apparatus for judging a condition of injection of reducing agent, according to the present invention.

Next is a description of the condition judging operation of the apparatus for judging the condition of reducing agent injection of the sixth embodiment, with reference to the flow chart of FIG. 7. Also in this embodiment, the operation is started by an input of an ON signal from the key switch 48.

In step 51, the current liquid level is read from the fuel level meter 54 and stored as fuel liquid level Lf0, and the currently stored air consumption value is reset.

In step 52, respective measurements of the fuel consumption and the air consumption are started. Here, measurement of the fuel consumption is calculated from a change in the liquid level (Lf1−Lf0) inside the fuel tank by reading the liquid level from the fuel level meter 54 at constant time intervals and storing and updating the value thereof as liquid level Lf1 as in the second embodiment. Furthermore measurement of the air consumption is performed as in the third embodiment.

In step 53, it is judged whether or not the fuel consumption ΔLf calculated from a change in the liquid level (Lf1−Lf0) inside the fuel tank is equal to or greater than a preset predetermined fuel consumption Lf, and the measurement operation in step 52 is repetitively executed until ΔLf becomes equal to or greater than Lf (ΔLf≦Lf). When ΔLf≧Lf, it is determined that the fuel consumption has reached the predetermined fuel consumption, and control proceeds to step 54.

The operations in steps 54 through 56 are the same as in steps 44 through 46 in the fifth embodiment. In step 54, the air consumption A1 at that time is confirmed. In step 55, when the confirmed air consumption A1 is within a range of Amin≦A1≦Amax, it is determined that injection of the urea water solution is normal, and control returns to step 51. On the other hand, if not in the range of Amin≦A1≦Amax, it is determined that the injection of the urea water solution is abnormal, and the control unit 32 generates an abnormality judgment output in step 56, and drives the warning unit 46 to inform the user of abnormal injection of the urea water solution.

Next is a description of a seventh embodiment of the apparatus for judging the condition of injection of reducing agent according to the present invention.

In the apparatus for judging the injection condition of reducing agent of the seventh embodiment, the configuration is such that the injection condition of liquid reducing agent is judged from a relationship between the running time and the air consumption, and includes the configuration of a seventh judgment means that judges that there is abnormal injection of the urea water solution when the air consumption while traveling for a predetermined time is not within a predetermined range. In this embodiment, the time during which the vehicle speed is not zero is measured as the running time as in the fourth embodiment. Furthermore measurement of the air consumption is performed by using the air flow sensor 56 as in the third, the fifth, and the sixth embodiments. Therefore, the apparatus for judging the condition of reducing agent injection of this embodiment comprises the control unit 32, the vehicle speed sensor 50, the air-flow sensor 56, and the warning unit 46.

Figure 8:
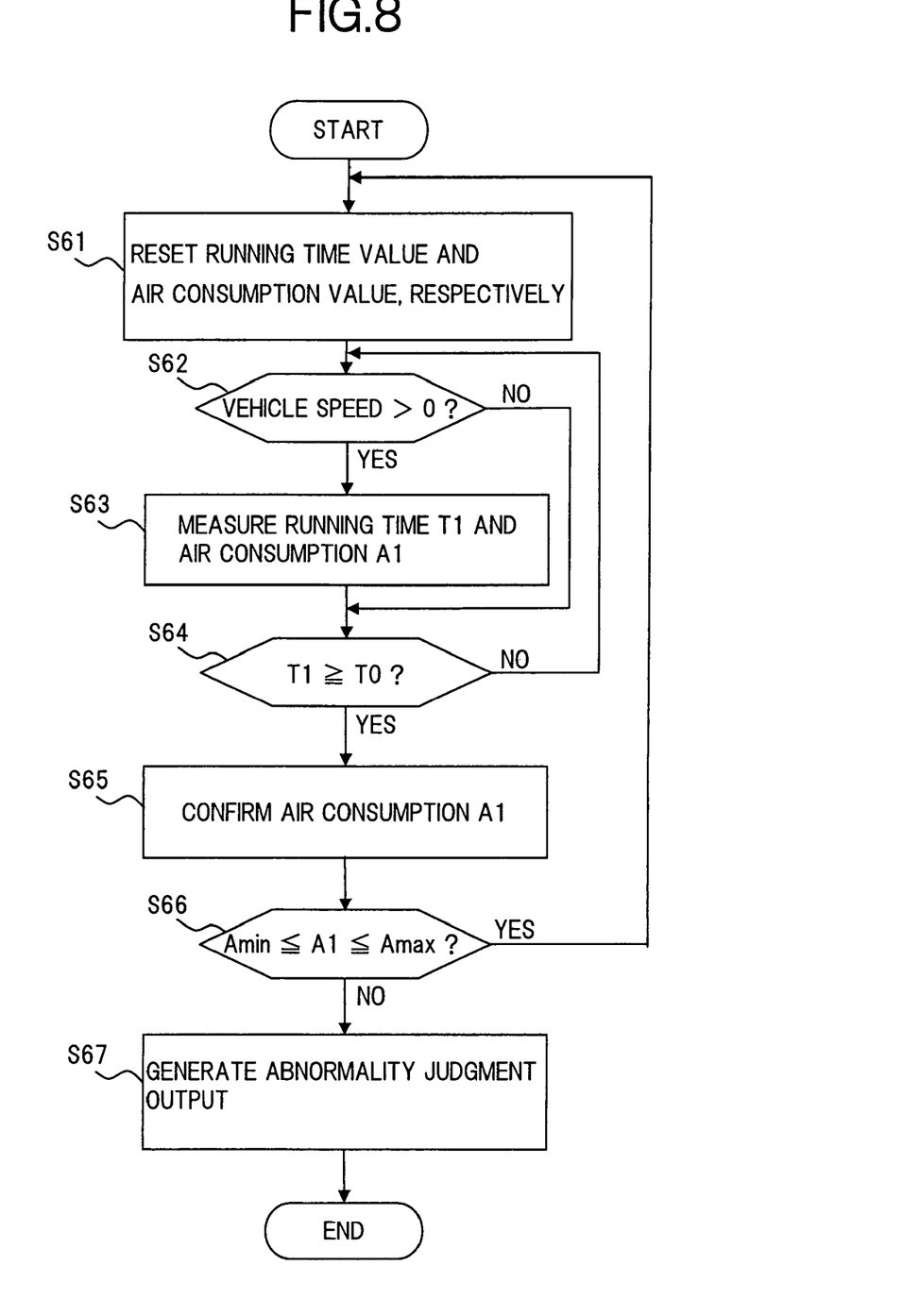
FIG. 8 is a flow chart for explaining the operation of a seventh embodiment of the apparatus for judging a condition of injection of reducing agent, according to the present invention.

Next is a description of the condition judging operation of the apparatus for judging the condition of injection of reducing agent according to the seventh embodiment, with reference to the flow chart of FIG. 8. Also in this embodiment, the operation is started by an input of an ON signal from the key switch 48.

In step 61, the running time value, which has been stored when the key switch 48 is turned off in the previous operation, and the currently stored air consumption value are reset respectively.

In step 62, it is judged whether or not the vehicle speed is greater than 0 km/h based on the vehicle speed signal from the vehicle speed sensor 50. When the judgment result is YES, control proceeds to step 63, where the running time is integrated and the integrated value is stored as running time T1, the air consumption A1 is measured by the air flow sensor 56 as in the sixth embodiment, and control proceeds to step 64. When the judgment result is NO, control skips step 63 and proceeds to step 64.

In step 64, it is judged whether or not the running time T1 becomes equal to or greater than a preset predetermined running time T0, and the operations in steps 62 and 63 are repetitively executed until T1 becomes equal to or greater than T0 (T1≧T0). When T1≧T0, it is determined that the vehicle has traveled for the predetermined time, and control proceeds to step 65.

The operations in steps 65 through 67 are the same as in steps 54 through 56 in the sixth embodiment. In step 65 the air consumption A1 at that time is confirmed. In step 66, when the confirmed air consumption A1 is in a range of Amin≦A1≦Amax, it is determined that injection of the urea water solution is normal, and control returns to step 61. On the other hand, if not in the range of Amin≦A1≦Amax, it is determined that the injection of the urea water solution is abnormal, and the control unit 32 generates an abnormality judgment output in step 67, and drives the warning unit 46 to inform the user of abnormal injection of the urea water solution.

Next is a description of an eighth embodiment of the apparatus for judging the condition of injection of reducing agent according to the present invention.

In the apparatus for judging the injection condition of reducing agent of the eighth embodiment, the configuration is such that the injection condition of liquid reducing agent is judged from a relationship between the supply indicated value of the liquid reducing agent determined by the control unit 32 and instructed to the reducing agent adding unit 28 and an actual injection supply amount, and includes the configuration of an eighth judgment means that judges that there is abnormal injection of the liquid reducing agent when a difference between the liquid reducing agent indicated value determined based on the engine operating state and instructed to the reducing agent adding unit 28 and the actual injection supply amount is not within a predetermined range. As the liquid reducing agent indicated value, for example, a liquid reducing agent added map value based on the engine operating state, an injection amount indicating signal transmitted from the control unit 32 to the reducing agent adding unit 28, or the like is used. For the measurement value of the actual injection supply amount, for example a flow sensor 52 is installed in the reducing agent supply piping 26 as shown by the broken line in FIG. 1, and the measurement value of the flow sensor 52 is used.

Figure 9:
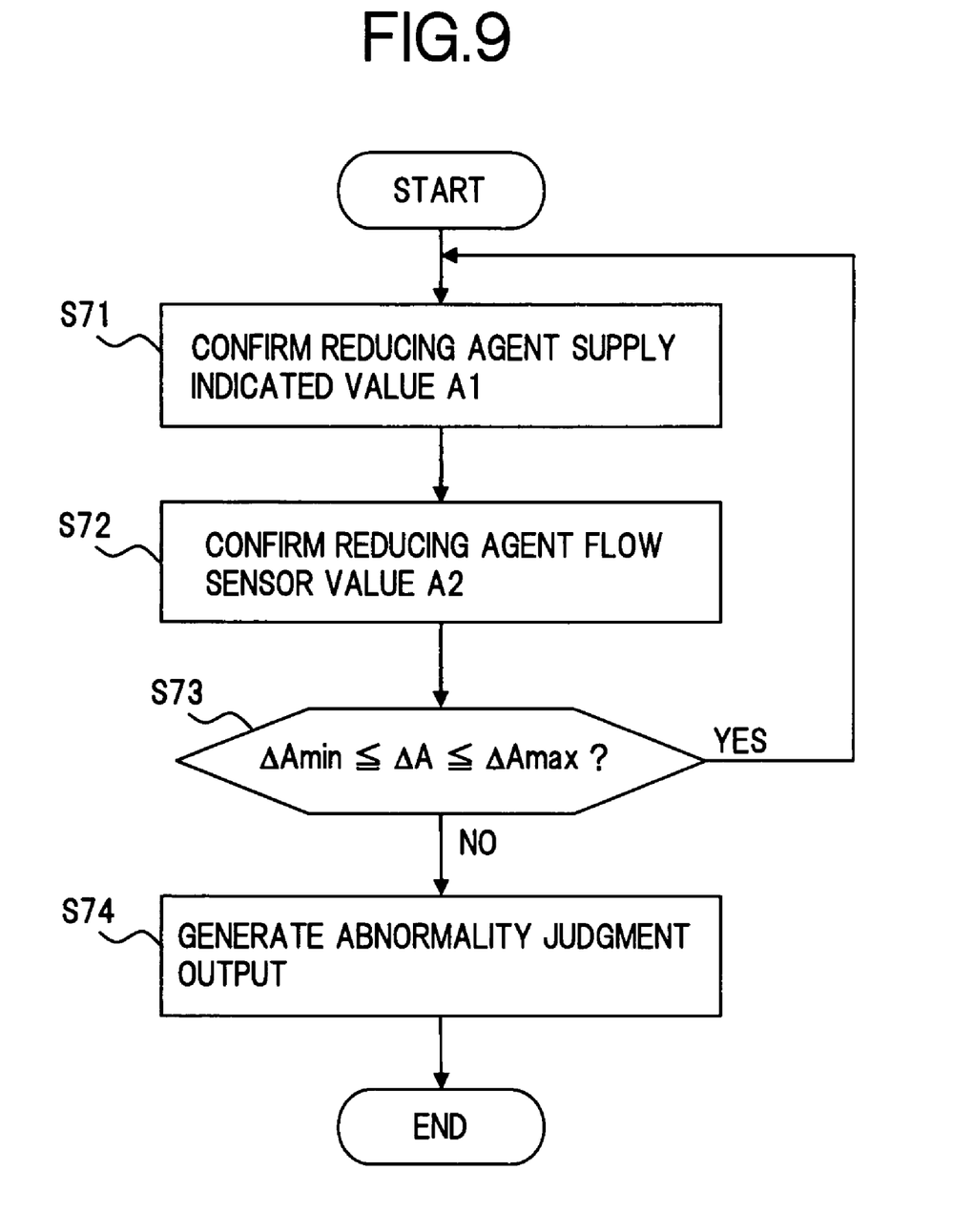
FIG. 9 is a flow chart for explaining the operation of an eighth embodiment of the apparatus for judging a condition of injection of reducing agent, according to the present invention.

Next is a description of the condition judging operation of the apparatus for judging the condition of injection of reducing agent according to the eighth embodiment, with reference to the flow chart of FIG. 9. Also in this embodiment, the operation is started by an input of an ON signal from the key switch 48.

In step 71, the control unit 32 determines a required amount of the urea water solution corresponding to the engine operating state detected based on the respective signals from the rotating speed sensor 34, the accelerator opening sensor 36, the exhaust gas temperature sensor 38, and the like, using the liquid reducing agent added map value, and outputs an instruction signal of the urea water solution to be injection supplied to the reducing agent adding unit 28. At this time, the added map value or the instruction signal value to be output to the reducing agent adding unit 28 are confirmed as the supply indicated value A1.

In step 72, an actual supply value A2 actually injection supplied from the reducing agent adding unit 28 based on the instruction signal is confirmed based on the measurement value of the flow sensor 52.

In step 73, a difference ΔA (=A1−A2) between the supply indicated value A1 and the actual supply value A2 confirmed in steps 71 and 72 is calculated, and it is judged whether or not the difference ΔA is in a preset range between a lower limit ΔAmin and an upper limit ΔAmax for the case of normal injection. If ΔAmin≦ΔA≦ΔAmax, the control unit determines that the injection of the urea water solution is normal, and control returns to step 71. On the other hand, if not ΔAmin≦ΔA≦ΔAmax, the control unit determines that the injection of the urea water solution is abnormal, and in step 74, the control unit 32 generates an abnormality judgment output, and drives the warning unit 46 to inform the user of abnormal injection of the urea water solution.

The apparatus for judging the condition of injection of reducing agent according to the present invention is not limited to the above embodiments, and may be configured so as to judge the injection condition of reducing agent by combining two or more of the first to the eighth embodiments.

In the above embodiments, an example with urea water solution as the liquid reducing agent has been described. However, needless to say, the apparatus for judging the condition of injection of reducing agent of the present invention is also capable of being incorporated in an exhaust gas purification system that uses other liquid reducing agents such as an ammonia water, a hydrocarbon such as gas oil, and alcohol.

In the present invention, since abnormal injection of the liquid reducing agent can be found at an early stage, and reliability and NOx purifying ability of the exhaust gas purification system that injection supplies the liquid reducing agent to reduce the NOx exhaust amount can be improved, industrial applicability is significant.

It should be appreciated that the entire contents of Japanese Patent Application No. 2005-071007, filed on Mar. 14, 2005, on which the convention priority is claimed is incorporated herein by reference.

It should also be understood that many modifications and variations of the described embodiments of the invention will occur to a person having an ordinary skill in the art without departing from the spirit and scope of the present invention as claimed in the appended claims.

We claim:

1. An apparatus for judging a condition of injection of reducing agent in an exhaust gas purification system comprising a reduction catalyst disposed in an exhaust system of an engine to reduce and purify nitrogen oxide in an exhaust gas, and a reducing agent injection supply means that mixes liquid reducing agent in an amount required depending on an engine operating state with air and injection-supplies this air-mixed reducing agent into the exhaust gas flowing on an upstream side of the reduction catalyst, wherein there is provided such a configuration that a condition of injection of the liquid reducing agent is judged by using at least one of a plurality of judgment means selected from:

a first judgment means that judges that the condition of injection of the liquid reducing agent is abnormal when a consumption of the air during traveling of a predetermined distance is not within a predetermined range;

a second judgment means that judges that the condition of injection of the liquid reducing agent is abnormal when a consumption of the air during consuming of a predetermined amount of fuel is not within a predetermined range; and a third judgment means that judges that the condition of injection of the liquid reducing agent is abnormal when a consumption of the air during traveling for a predetermined time is not within a predetermined range.

2. The apparatus according to claim 1, further comprising an informing means that informs of abnormality based on an abnormality judgment output of the selected judgment means.

3. The apparatus according to claim 1, wherein the predetermined distance is measured by using either one of a travel distance integration meter value and a vehicle speed sensor value.

4. The apparatus according to claim 1, wherein the predetermined amount of fuel is measured by using either one of a liquid level variation value for inside a fuel tank and a fuel injection supply calculation amount determined depending on a detected engine operating state.

5. The apparatus according to claim 1, wherein the consumption of the air is measured by using a sensor value of an air-flow sensor interposed in an air supply pipe.

6. The apparatus according to claim 1, wherein the predetermined time is measured by using any one of: engine operating time, time during which vehicle speed is not zero, and time during which exhaust gas temperature is equal to or greater than a predetermined temperature.

* * * * *

UNITED STATES PATENT AND TRADEMARK OFFICE
CERTIFICATE OF CORRECTION

| | | |
|---|---|---|
| PATENT NO. | : 7,975,470 B2 | |
| APPLICATION NO. | : 11/880858 | |
| DATED | : July 12, 2011 | |
| INVENTOR(S) | : Kiminobu Hirata et al. | |

It is certified that error appears in the above-identified patent and that said Letters Patent is hereby corrected as shown below:

In Column 10, Line 46: Replace "Lf ($\Delta Lf \leq Lf$)", with -- Lf ($\Delta Lf \geq Lf$) --

Signed and Sealed this
Twentieth Day of December, 2011

David J. Kappos
*Director of the United States Patent and Trademark Office*